United States Patent [19]

Kojima et al.

[11] Patent Number: 4,575,437

[45] Date of Patent: Mar. 11, 1986

[54] PROCESS FOR PRODUCING OPTICAL FIBER FOR OPTICAL TRANSMISSION

[75] Inventors: Keiichi Kojima; Keiji Ueno, both of Osaka, Japan

[73] Assignee: Sumitomo Electric Industries, Ltd., Osaka, Japan

[21] Appl. No.: 691,038

[22] Filed: Jan. 14, 1985

[30] Foreign Application Priority Data

Jan. 13, 1984 [JP] Japan ................................. 59-5398

[51] Int. Cl.$^4$ ........................... G02B 6/22; B29D 11/00
[52] U.S. Cl. ........................................ 264/1.4; 264/1.5; 264/22; 350/96.34; 427/36; 427/163
[58] Field of Search ........................ 264/1.4, 1.5, 22; 350/96.34; 427/36, 163

[56] References Cited

U.S. PATENT DOCUMENTS 3,980,390  9/1976  Yamamoto .................. 350/96.34
4,324,575  4/1982  Levy ............................ 427/36
4,455,267  6/1984  Strahan et al. .............. 264/1.4

FOREIGN PATENT DOCUMENTS 98706  11/1983  Japan ......................... 264/1.5

Primary Examiner—James Lowe
Attorney, Agent, or Firm—Sughrue, Mion, Zinn, Macpeak & Seas

[57] ABSTRACT

A process for producing an optical fiber is disclosed. The process comprises forming a primary coating layer on a glass fiber, forming a secondary coating layer comprising a polyamide resin or polyester elastomer composition containing a polyfunctional monomer as a crosslinking agent, and crosslinking the secondary coating layer by irradiation with electron rays having a maximum transmittance thickness smaller than the total thickness of the primary and secondary coating layers. The resulting optical fiber has excellent heat resistance without causing optical transmission loss.

8 Claims, 3 Drawing Figures

PROCESS FOR PRODUCING OPTICAL FIBER FOR OPTICAL TRANSMISSION

FIELD OF THE INVENTION

This invention relates to a process for producing a heat resistant glass fiber for optical transmission which is free from thermal deformation of a secondary coating layer at high temperatures.

BACKGROUND OF THE INVENTION

Recently, an information transmitting system using a glass fiber for optical transmisstion (hereinafter referred to as optical fiber) has greatly been developed. Optical fibers are characterized by no fear of short circuit, spark, etc., freedom from electromagnetic distrubances, easiness in lightening or thinning, and the like, as compared with usual electric wires. Therefore, optical fibers have recently been employed in various applications as compared with the conventional electric wires. However, since most of optical fibers which are presently used comprise a glass fiber composed of a core and a cladding, a primary coating layer made of a silicone resin and a secondary coating layer made of a nylon resin as disclosed in, e.g., U.S. Pat. No. 3,980,390, and the secondary coating layer is melted in a high temperature atmosphere, e.g., at 200° C., they cannot withstand use in such a high temperature atmosphere.

Known methods for improving heat resistance of polymers, for example, polyethylene, include chemical crosslinking using organic peroxides or crosslinking upon radiation to obtain crosslinked polyethylene which does not undergo substantial thermal deformation at temperatures above the melting point of polyethylene. However, when chemical crosslinking is adopted to the secondary coating layer of optical fibers, heating under pressure involved therein causes internal distortion and the like, thereby resulting in increase of transmission loss. Therefore, this technique cannot be applied to optical fibers. Further, if the secondary coating layer is crosslinked by irradiation, an increase of transmission loss occurs at a very low radiation dose, e.g., 20 rads, as apparently shown in FIG. 1 wherein $\gamma$ rays are used. Therefore, it appears that radiation having great transmittance, such as $\gamma$ rays, cannot be utilized for crosslinking of the secondary coating layer of optical fibers.

SUMMARY OF THE INVENTION

Accordingly, an object of this invention is to provide a process for producing a heat resistant optical fiber.

Another object of this invention is to provide a process for producing a heat resistant optical fiber, wherein a secondary coating layer of the optical fiber can be crosslinked without causing transmission loss of the fiber.

In the light of the above-described circumstances, the present inventors conducted extensive studies on a process for crosslinking a secondary coating layer of optical fibers. As a result, it has now been found that the above objects can be achieved by a process for producing an optical fiber, which comprises forming a primary coating layer on a glass fiber, forming a secondary coating layer comprising a polyamide resin or polyester elastomer composition containing a polyfunctional monomer as a crosslinking agent, and crosslinking the secondary coating layer by irradiating with electron rays having a maximum transmittance thickness smaller than the total thickness of the primary coating layer and the secondary coating layer.

BRIEF DESCRIPTION OF THE DRAWINGS

In FIGS. 2 and 3, the curves (1), (2) and (3) are obtained at accelerating voltages of 400 KeV, 300 KeV and 250 KeV, respectively.

DETAILED DESCRIPTION OF THE INVENTION

Figure 1:
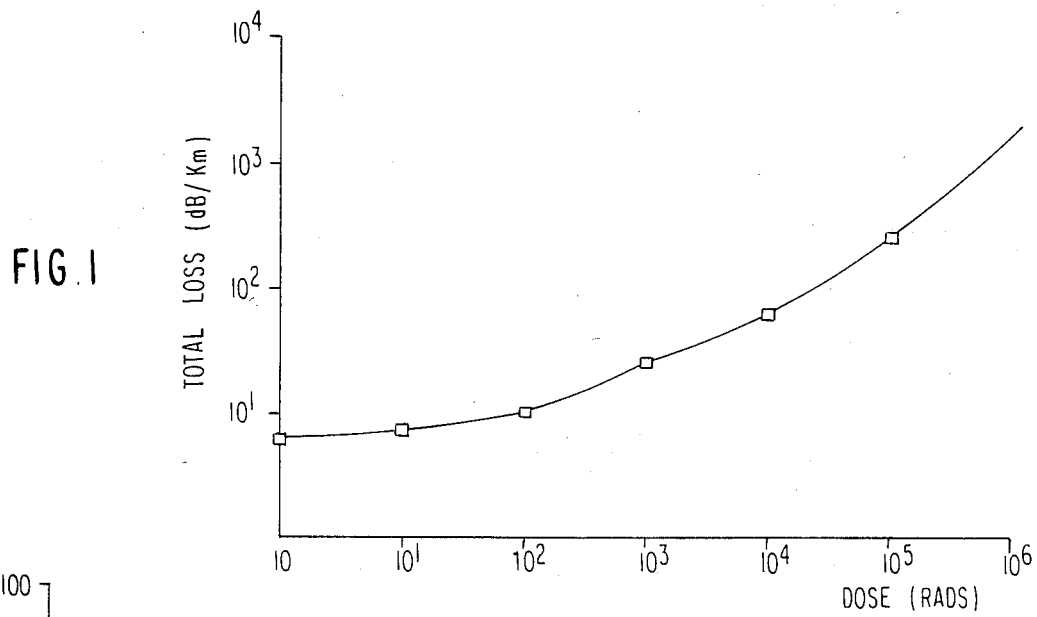
FIG. 1 is a graph showing a relationship between a radiation dose of $\gamma$ rays and a transmission loss of an optical fiber when a secondary coating layer of the optical fiber is crosslinked by irradiation with $\gamma$ rays.

The polyamide resin which can be used as the secondary coating layer in the present invention is preferably a polymer comprising a repeating unit containing from 4 to 23 carbon atoms from the standpoint of mechanical strength, such as nylon 6, 66, 610, 612 and 12, with nylon 12 being preferred.

The polyester elastomer which can be used as the secondary coating layer in the present invention has a hard segment having a certain length in its molecular chain and a soft segment in the same molecular chain. The hard segment and the soft segment are typically exemplified by a polyester moiety and a polyether moiety, respectively, and can be represented by the following models:

Soft Segment:

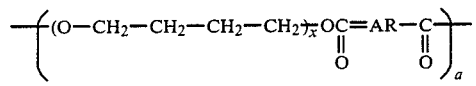

Hard Segment: 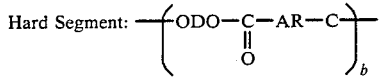

wherein AR represents an aromatic moiety of a dicarboxylate; D represents an alkylene moiety of a diol; x represents a number of ether linkages; and a and b each represents a molar ratio of the respective segment.

The above-described polyamide resins and polyester elastomers can be used for the secondary coating because of their satisfactory softness and processability, less causativeness on optical loss due to extrusion-coating, and excellent abrasion resistance.

The polyester elastomer which can be used in the present invention preferably has a Shore hardness of from 25D to 75D. Although a Shore hardness less than 25D is favorable in terms of softness of the resulting optical fiber, the strength is not necessarily sufficient to withstand particularly strong outer forces and, therefore, the range of application of the resulting optical fibers is limited. If a Shore hardness exceeds 75D, softness becomes poor, and the melting point rises as the hardness increases only to lead to evaporation of the crosslinking agent during mixing.

The polyfunctional monomer which can be used as a crosslinking agent in the present invention is selected from the group consisting of triallyl cyanurate, triallyl isocyanurate, trimethylolpropane trimethacrylate and trimethylolpropane triacrylate. Preferred examples of polyfunctional monomers are triallyl cyanurate, triallyl isocyanurate and trimethylolpropane trimethacrylate in view of their high crosslinking effect.

The amount of the polyfunctional monomer to be added depends on the number of the functional groups present per molecule, but, in general, is at least about 0.1 part by weight, preferably from 0.1 to 30 parts by weight, and more preferably from 0.5 to 15 parts by weight, per 100 parts by weight of the polyamide resin or polyester elastomer.

According to the present invention, the thickness of each of the primary and secondary coating layers as well as the total thickness of the primary and secondary coating layers are not limited since the maximum transmittance thickness of electron rays, i.e., electron accelerating voltage can be suitably selected depending upon the total thickness of these layers. Accordingly, the present invention can be applied to optical fibers having primary and secondary coating layers having a thickness normally used in conventional optical fibers. Typical examples of such optical fiber presently used include, for example, (1) an optical fiber having an outer diameter of 0.9 mm comprising a glass fiber having an outer diameter of 125 μm and a resin coating layer provided thereon (coating layer thickness=about 0.39 mm), (2) an optical fiber having an outer diameter of 0.9 mm comprising a glass fiber having an outer diameter of 300 μm and a resin layer provided thereon (coating layer thickness=0.3 mm), and (3) an optical fiber having an outer diameter of 3 mm comprising a glass fiber having an outer diameter of 300 μm and a resin coating layer (coating layer thickness=1.35 mm).

Figure 2:
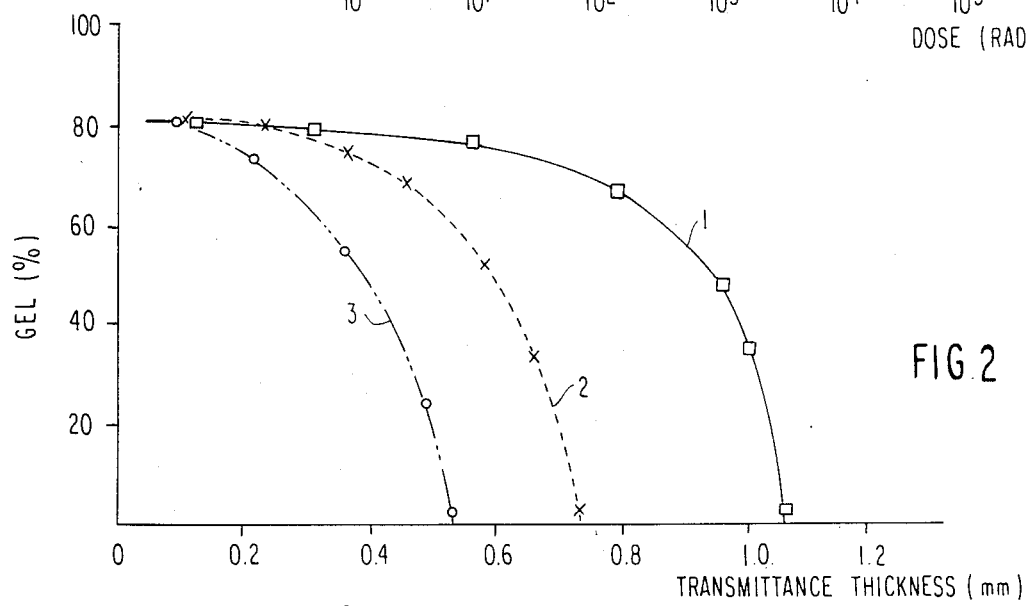
FIG. 2 is a graph showing a relationship between a transmittance thickness of radiation and a gel ratio of a crosslinked polyamide resin, with the accelerating voltage of an electron accelerator being varied.
Figure 3:
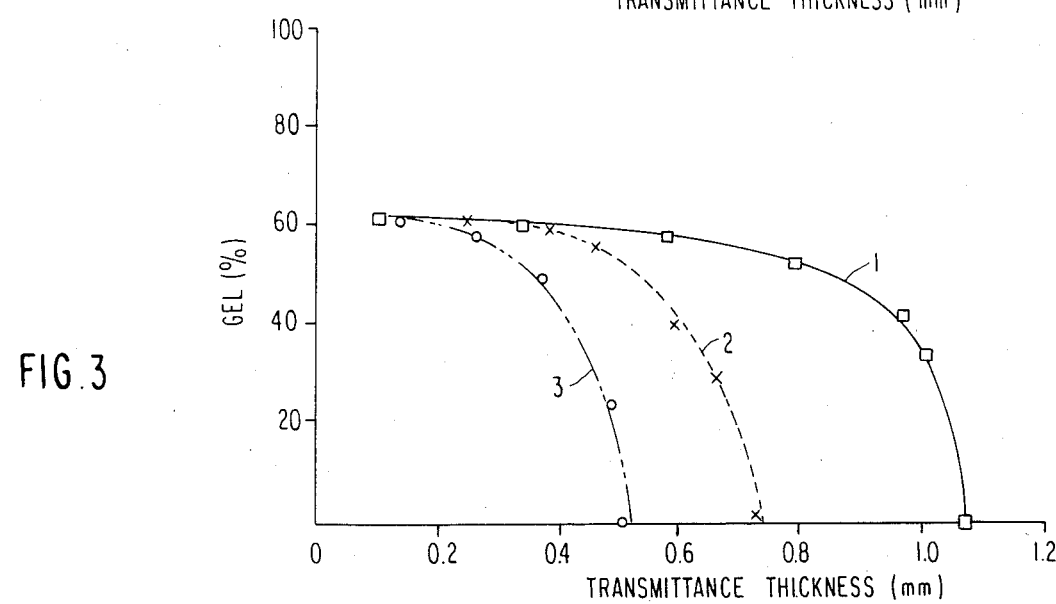
FIG. 3 is a graph showing a relationship between a transmittance thickness of radiation and a gel ratio of a crosslinked polyester elastomer, with the accelerating voltage of an electron accelerator being varied.

In the process of this invention, the secondary coating layer is irradiated with electron rays having a maximum transmittance thickness smaller than the total thickness of the primary and secondary coating layers, thereby crosslinking the polyamide resin or polyester elastomer. FIG. 2 or 3 illustrates the relationship between an accelerating voltage of an electron accelerator for irradiating the secondary coating layer comprising the polyamide resin composition or the polyester elastomer composition and a gel ratio (content of the solvent-insoluble matter) that represents a degree of crosslinking of the polyamide resin or the polyester elastomer, respectively. In these figures, the curves (1) to (3) indicate accelerating voltages of 400 KeV, 300 KeV and 250 KeV, respectively. Since the total thickness of the primary and secondary coating layers according to the present invention is generally not more than about 0.5 mm, it can be seen from FIG. 2 or 3 that the electron accelerating voltage which can be applied for irradiation of electron rays should not be higher than 250 KeV. However, in the optical fiber provided with the coating layers having a total thickness of 1.35 mm, electron rays at an accelerating voltage of 400 KeV can be irradiated as can be understood from FIGS. 2 and 3. It will be apparent that, when the maximum transmittance thickness is smaller than the total thickness of the coating layers, the inside of the coating layers remains uncrosslinked. It is to be understood that the optical fiber having a secondary coating layer, only the surface of which is crosslinked by radiation, is also within the scope of this invention since such secondary coating layer has crack resistant property.

The dose of electron rays radiation varies depending upon the thickness of coating layers, type of resins used for the coating layers, type and amounts of polyfunctional monomer used, etc., but is generally in the range of about 1 to about 50 Mrads.

The glass fiber used in the present invention can be any type of conventional glass fibers. Usually, the glass fiber has a structure of quartz core and a cladding, but a glass fiber having no boundary surface between the core and the cladding, i.e., a glass fiber having a refractive index continuously changing in its radius direction, can be used.

The primary coating provided on the glass fiber can be, for example, a polyvinyl chloride resin, polyethylene, a silicone resin, a urethane-acrylate resin, etc., but is not limited thereto. The combination of the primary coating and the secondary coating of polyester elastomer composition or polyamide resin composition containing polyfunctional monomer according to this invention is very useful for reducing transmission loss due to microbending.

The present invention will now be illustrated in greater detail by way of the following non-limiting examples. In these examples, a glass fiber having a core/cladding structure was used.

EXAMPLE 1

A quartz fiber composed of a quartz core and a cladding and having a diameter of 125 μm was coated with a silicone resin to a thickness of 150 μm to form a primary coating layer. The fiber was further coated by extrusion with Pelprene P 70B (a trade name produced by Toyo Spinning Co., Ltd.; JIS hardness: 96; Shore hardness: 46D; melting point 200° C.; specific gravity: 1.174) containing 5 parts by weight of triallyl isocyanurate per 100 parts by weight of Pelprene P 70B to form a secondary coating layer having a thickness of 0.35 mm. Thereafter, the resulting fiber was irradiated with 10 Mrad of electron rays using a low voltage accelerator having an accelerating voltage of 250 KeV to effect crosslinking of the secondary coating layer comprising Pelprene P 70B. The transmission loss of the resulting optical fiber was found to be 3 dB/Km at a wavelength of 0.8 μm, which is almost equal to that of the conventional non-irradiated optical fibers.

Further, when the optical fiber was allowed to stand in a thermostat at 250° C. for 10 minutes, no melting or cracking occurred in the secondary coating layer and no substantial change was observed as compared with those samples preserved at room temperature.

EXAMPLE 2

An optical fiber was produced in the same manner as described in Example 1 except that Pelprene P 70B for the secondary coating layer was replaced by UBE 3035U (a trade name of 12 nylon produced by Ube Industries, Ltd.). The transmission loss of the resulting optical fiber was found to be 3 dB/Km at a wavelength of 0.8 μm, which is almost equal to that of the conventional non-irradiated optical fibers.

Further, when the optical fiber was allowed to stand in a thermostat at 250° C. for 10 minutes, no melting or cracking occurred and no substantial change was observed in the secondary coating layer as compared with those samples preserved at room temperature.

COMPARATIVE EXAMPLE

An optical fiber was produced in the same manner as described in Example 1 except that the secondary coating layer was irradiated with 10 Mrad of electron rays at an accelerating voltage of 1 MeV.

The resulting optical fiber was determined for transmission loss at a wavelength of 0.8 μm and, further, allowed to stand in a thermostat at 250° C. for 10 minutes to observe the changes of the secondary coating layer. As a result, although no particular changes in appearance of the secondary coating layer was observed after preservation at 250° C. for 10 minutes, the transmission loss at 0.8 μm was conspicuously increased to 500 dB/Km as compared with 3 dB/Km was measured in Example 1, which means that the product cannot be used as an optical fiber.

On the other hand, an optical fiber having the same structure as in Example 1 but not having been subjected to irradiation was prepared and tested in the same manner as in Example 1. This non-irradiated optical fiber showed a transmission loss as low as 3 dB/Km at a wavelength of 0.8 μm, but the secondary coating layer was melted upon being allowed to stand in a thermostat at 250° C. for 10 minutes, indicating that the non-irradiated fiber cannot be used as an optical fiber.

As described above, the process according to the present invention makes it possible to produce an optical fiber excellent in heat resistance without causing an increase in transmission loss.

While the invention has been described in detail and with reference to specific embodiments thereof, it will be apparent to one skilled in the art that various changes and modifications can be made therein without departing from the spirit and scope thereof.

What is claimed is:

1. A process for producing an optical fiber for optical transmission, which comprises forming a primary coating layer on a glass fiber, forming a secondary coating layer comprising a polyamide resin composition or polyester elastomer composition containing a polyfunctional monomer on the primary coating layer, and crosslinking the secondary coating layer by irradiation with electron rays having a maximum transmittance thickness smaller than the total thickness of the primary coating layer and the secondary coating layer.

2. A process as claimed in claim 1, wherein the polyamide resin is a polymer comprising a repeating unit containing from 4 to 23 carbon atoms.

3. A process as claimed in claim 1, wherein the polyamide resin is nylon 12.

4. A process as claimed in claim 1, wherein the polyester elastomer has a Shore hardness of from 25D to 75D.

5. A process as claimed in claim 1, wherein the polyfunctional monomer is selected from the group consisting of triallyl cyanurate, triallyl isocyanurate, trimethylolpropane trimethacrylate and trimethylolpropane triacrylate.

6. A process as claimed in claim 5, wherein the polyfunctional monomer is triallyl cyanurate, triallyl isocyanurate or trimethylolpropane trimethacrylate.

7. A process as claimed in claim 1, wherein the polyfunctional monomer is present in an amount of from 0.1 to 30 parts by weight per 100 parts by weight of the polyamide resin or the polyester elastomer.

8. A process as claimed in claim 7, wherein the polyfunctional monomer is present in an amount of from 0.5 to 15 parts by weight per 100 parts by weight of the polyamide resin or the polyester elastomer.

* * * * *